United States Patent
Gay et al.

(10) Patent No.: US 7,734,802 B1
(45) Date of Patent: Jun. 8, 2010

(54) DYNAMICALLY ADAPTABLE COLLABORATIVE ELECTRONIC MEETING SPACE

(75) Inventors: Jonathan Gay, Mill Valley, CA (US); Giacomo Guilizzoni, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1309 days.

(21) Appl. No.: 10/857,254

(22) Filed: May 28, 2004

(51) Int. Cl.
G06F 15/16 (2006.01)
G06F 3/00 (2006.01)

(52) U.S. Cl. ...................... 709/231; 715/732
(58) Field of Classification Search ................ 709/205, 709/204, 218, 231; 715/732
See application file for complete search history.

(56) References Cited

U.S. PATENT DOCUMENTS

| | | | |
|---|---|---|---|
| 5,471,318 A | 11/1995 | Ahuja et al. | |
| 5,822,525 A * | 10/1998 | Tafoya et al. | 709/204 |
| 5,956,487 A * | 9/1999 | Venkatraman et al. | 709/218 |
| 5,996,002 A | 11/1999 | Katsurabayashi et al. | |
| 5,999,208 A | 12/1999 | McNerney et al. | |
| 6,091,408 A * | 7/2000 | Treibitz et al. | 715/753 |
| 6,119,147 A | 9/2000 | Toomey et al. | |
| 6,237,025 B1 | 5/2001 | Ludwig et al. | |
| 6,334,141 B1 | 12/2001 | Varma et al. | |
| 6,560,637 B1 * | 5/2003 | Dunlap et al. | 709/204 |
| 6,564,246 B1 | 5/2003 | Varma et al. | |
| 6,789,105 B2 | 9/2004 | Ludwig et al. | |
| 6,938,069 B1 | 8/2005 | Narayanaswamy | |
| 7,007,235 B1 | 2/2006 | Hussein et al. | |
| 7,213,030 B1 * | 5/2007 | Jenkins | 707/104.1 |
| 7,240,287 B2 * | 7/2007 | Qureshi et al. | 715/730 |
| 7,249,157 B2 | 7/2007 | Stewart et al. | |
| 7,383,302 B2 | 6/2008 | Cohen et al. | |
| 7,512,887 B2 * | 3/2009 | Keohane et al. | 715/732 |
| 2001/0013843 A1 * | 8/2001 | Fujiwara et al. | 345/1.2 |
| 2002/0075305 A1 | 6/2002 | Beaton et al. | |
| 2002/0156808 A1 | 10/2002 | Duffy et al. | |
| 2003/0065722 A1 * | 4/2003 | Ieperen | 709/205 |
| 2003/0095113 A1 * | 5/2003 | Ma et al. | 345/175 |

(Continued)

OTHER PUBLICATIONS

Dewan, P. and Choudhard, R. 1991. Flexible user interface coupling in a collaborative system. In Proceedings of the SIGCHI Conference on Human Factors in Computing Systems: Reaching Through Technology (New Orleans, Louisiana, United States, Apr. 27-May 2, 1991). S. P. Robertson, G. M. Olson, and J. S. Olson, Eds. CHI '91. ACM, New York, NY.*

(Continued)

*Primary Examiner*—Ajay Bhatia
(74) *Attorney, Agent, or Firm*—Kilpatrick Stockton LLP

(57) ABSTRACT

A collaborative electronic presentation application is disclosed allowing real-time editing of an electronic presentation. The electronic presentation is made up of a plurality of scenes, each having one or more meeting objects or pods that display various information to participating users. Some of the participating users may have presentation rights while other users may have only viewing rights. Presenters may request to edit or prepare one of the scenes that is not currently active within the electronic presentation. When requested, the preparing presenter is shown the requested scene while each of the other meeting participants remain viewing the currently active scene. The preparing presenter may then edit the selected scene or even create a new scene to add to the presentation while the electronic presentation is in progress.

13 Claims, 6 Drawing Sheets

U.S. PATENT DOCUMENTS

| | | | |
|---|---|---|---|
| 2003/0110218 A1* | 6/2003 | Stanley | 709/204 |
| 2003/0145052 A1* | 7/2003 | Watanabe | 709/204 |
| 2003/0208534 A1* | 11/2003 | Carmichael | 709/203 |
| 2003/0222890 A1* | 12/2003 | Salesin et al. | 345/629 |
| 2003/0236830 A1* | 12/2003 | Ortiz et al. | 709/246 |
| 2004/0008221 A1* | 1/2004 | O'Neal et al. | 345/730 |
| 2004/0039834 A1* | 2/2004 | Saunders et al. | 709/231 |
| 2004/0051744 A1* | 3/2004 | Fukui et al. | 345/848 |
| 2004/0081951 A1 | 4/2004 | Vigue et al. | |
| 2004/0217946 A1* | 11/2004 | Hamano | 345/173 |
| 2004/0230651 A1* | 11/2004 | Ivashin | 709/204 |
| 2005/0114475 A1 | 5/2005 | Chang et al. | |
| 2005/0114521 A1* | 5/2005 | Lee et al. | 709/228 |
| 2005/0273510 A1* | 12/2005 | Schuh | 709/225 |
| 2006/0048058 A1* | 3/2006 | O'Neal et al. | 715/730 |
| 2006/0053196 A1 | 3/2006 | Spataro et al. | |
| 2006/0095376 A1* | 5/2006 | Mitchell et al. | 705/50 |
| 2006/0098174 A1* | 5/2006 | Ohuchi | 353/122 |
| 2007/0006080 A1* | 1/2007 | Finger et al. | 715/719 |
| 2007/0130177 A1* | 6/2007 | Schneider et al. | 707/100 |

OTHER PUBLICATIONS

Sun, C. and Chen, D. 2002. Consistency maintenance in real-time collaborative graphics editing systems. ACM Trans. Comput.-Hum. Interact. 9, 1 (Mar. 2002), 1-41.*

Swamy, N.; Kuljaca, O.; Lewis, F.L., "Internet-based educational control systems lab using NetMeeting," Education, IEEE Transactions on , vol. 45, No. 2, pp. 145-151, May 2002.*

Chiu, P., Boreczky, J., Girgensohn, A., and Kimber, D. 2001. LiteMinutes: an Internet-based system for multimedia meeting minutes. In Proceedings of the 10th international Conference on World Wide Web (Hong Kong, Hong Kong, May 1-5, 2001). WWW '01. ACM, New York, NY, 140-149.*

Anderson, R., Anderson, R., Simon, B., Wolfman, S. A., VanDeGrift, T., and Yasuhara, K. 2004. Experiences with a tablet PC based lecture presentation system in computer science courses. In Proceedings of the 35th SIGCSE Technical Symposium on Computer Science Education(Norfolk, Virginia, USA, Mar. 3-7, 2004).SIGCSE '04. ACM, New York, NY,56-60.*

Non-final Office Action for U.S. Appl. No. 10/856,734, mailed Aug. 9, 2007.

Final Office Action for U.S. Appl. No. 10/856,734, mailed Feb. 25, 2008.

Advisory Action for U.S. Appl. No. 10/856,734, mailed Mar. 21, 2008.

Non-final Office Action for U.S. Appl. No. 10/856,734, mailed Jul. 1, 2008.

Final Office Action for U.S. Appl. No. 10/856,734, mailed Oct. 27, 2008.

Interview Summary for U.S. Appl. No. 10/856,734, mailed Dec. 31, 2008.

Advisory Action for U.S. Appl. No. 10/856,734, mailed Jan. 28, 2009.

Non-final Office Action for U.S. Appl. No. 10/856,734, mailed May 11, 2009.

* cited by examiner

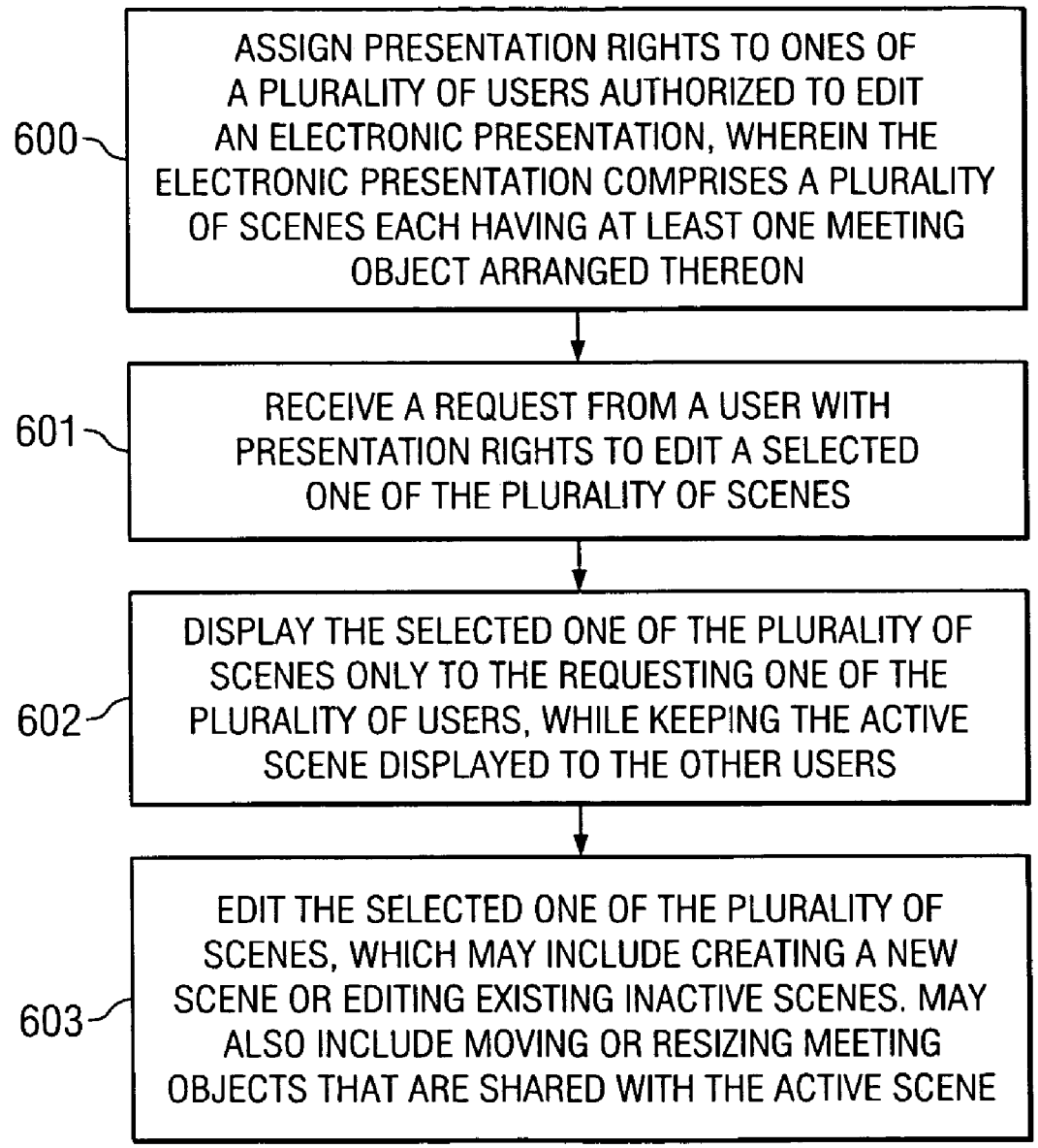

DYNAMICALLY ADAPTABLE COLLABORATIVE ELECTRONIC MEETING SPACE

CROSS-REFERENCE TO RELATED APPLICATIONS

The present application is related to concurrently filed, commonly assigned, and co-pending U.S. patent application Ser. No. 10/856,734, entitled "PRESENTER-ONLY MEETING CANVAS FOR COLLABORATIVE ELECTRONIC MEETING SPACE," the disclosure of which is hereby incorporated herein by reference.

TECHNICAL FIELD

The present invention relates, in general, to collaborative electronic meeting space, and, more specifically, to the dynamic adaptability of a collaborative electronic meeting interface.

BACKGROUND OF THE INVENTION

The first Internet was a communications system funded and built by researchers for military use. This Internet, originally known as ARPANET, was embraced by the research and academic communities as a mechanism for scientists to share and collaborate with other scientists. This collaborative network quickly evolved into the information superhighway of commerce and communication. The Internet explosion was due, in part, to the development of the World Wide Web (WWW) and graphically-based Web browsers, which facilitated a more graphically-oriented, multimedia system that uses the infrastructure of the Internet to provide information in a graphical, visual, and interactive manner that appeals to a wider audience of consumers seeking instant gratification.

As the technology underlying transmission bandwidth has grown in conjunction with the accessibility to such increasing transmission bandwidth, a new paradigm for the old idea of Internet collaboration is emerging that takes advantage of the modern graphical, visual world. This new paradigm is also driven by the advance in real-time or time-sensitive data transmission technology, such as Voice over Internet Protocol (VoIP) technology, and the like. Non-Internet videoconferencing, which has generally never been able to completely supplant teleconferencing as a viable means for reliable communications, is slowly fading away in favor of Internet-driven technology, such as collaborative electronic meetings. Services, such as WEBEX COMMUNICATIONS, INC.'S, WEBEX™ electronic meeting or collaboration services offer the ability for users to connect, at least initially, across the Internet to share voice, video, and data in real time for meetings, presentations, training, or the like.

In such collaborative meeting environments, a virtual meeting room typically is made up of several meeting objects which are generally containers for presentation information, such as slides, video, audio, documents, computer applications, and the like, that are themselves contained within the container of the meeting room. These meeting objects are typically placed into a static arrangement on the actual electronic meeting interface. Therefore, chat objects may be set on the bottom right of each meeting interface screen, while slide or other main presentation objects are set on the left half of each meeting interface screen. Meeting presenters usually enter the electronic meeting room shortly before the meeting to prepare the various objects with data, such as slides, animation, data, or the like. Once the meeting begins, each of the meeting participants, both presenters and viewers, see the static meeting interface with the presenters information loaded thereon. In some versions of current electronic meeting applications, a presenter may be able to layer different presentation or meeting objects that may be uncovered or hidden by selecting tabs. However, from meeting to meeting, the arrangement of the various meeting objects will be the same or similar.

Moreover, difficulties arise when an electronic meeting is planned with multiple presenters. Once the meeting begins, each participant views the same electronic meeting interface. A presenter who is waiting to begin his or her portion of the meeting will not be able to access his or her material on the electronic meeting application. The meeting interface remains locked until the meeting is over. The only way for such a preparing presenter to review his or her content after the meeting starts is to have a duplicate copy saved on a local computer. However, because the meeting application typically combines the individual pieces of data for the presenter, the preparing presenter's review will usually appear different from what will actually be viewed when his or her presentation is to begin.

BRIEF SUMMARY OF THE INVENTION

The various embodiments of the present invention are directed to a system and method that provides dynamic adaptability of a collaborative electronic meeting space. The electronic meeting application allows meeting presenters to build multiple scenes for any given electronic meeting. A scene is an arranged collection of meeting objects or pods. Each such pod or meeting object is fed by one or more data streams originating either from a pre-existing or live data source. The meeting objects process and render the data to display within the scene or meeting canvas. In preparation for a meeting, the presenter arranges the various pods or meeting objects that he or she plans to use on the meeting canvas.

Multiple different scenes may be created for the same meeting. Only one such scene, the active scene, is presented on the meeting canvas at any one time. The additional, inactive scenes may be layered under the current scene and accessible to the meeting presenters through tabs or menu selections available to the meeting presenters. The active or current scene is viewable by each meeting participant during an electronic meeting. The remaining inactive scenes lay idle until the presenter determines to bring any one of those scenes up to the meeting canvas.

Representative embodiments of the present invention are directed to a preparation status or method for meeting presenters that allows a meeting presenter to access, edit, and/or create scenes that are not the current scene at any point surrounding an electronic meeting, either before, during, or after the meeting. While the meeting is active, a presenter selects an existing scene for preparation. The meeting participants continue to view the current scene on the meeting canvas. However, the selecting presenter is taken to the selected scene. Each of the meeting objects or pods within the selected scene may be viewed or edited by the presenter unless that meeting object or pod is also in the current active scene. Such meeting objects or pods within the active scene may be moved or re-sized, but their content may not be affected. Furthermore, the editing will not take effect until the selected scene is brought to the meeting canvas as the new active scene. The meeting objects or pods that are not within the active scene may be fully edited by the presenter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 6 is a flowchart illustrating example steps that may be executed in implementing one embodiment of the present invention.

DETAILED DESCRIPTION OF THE INVENTION

Figure 1:
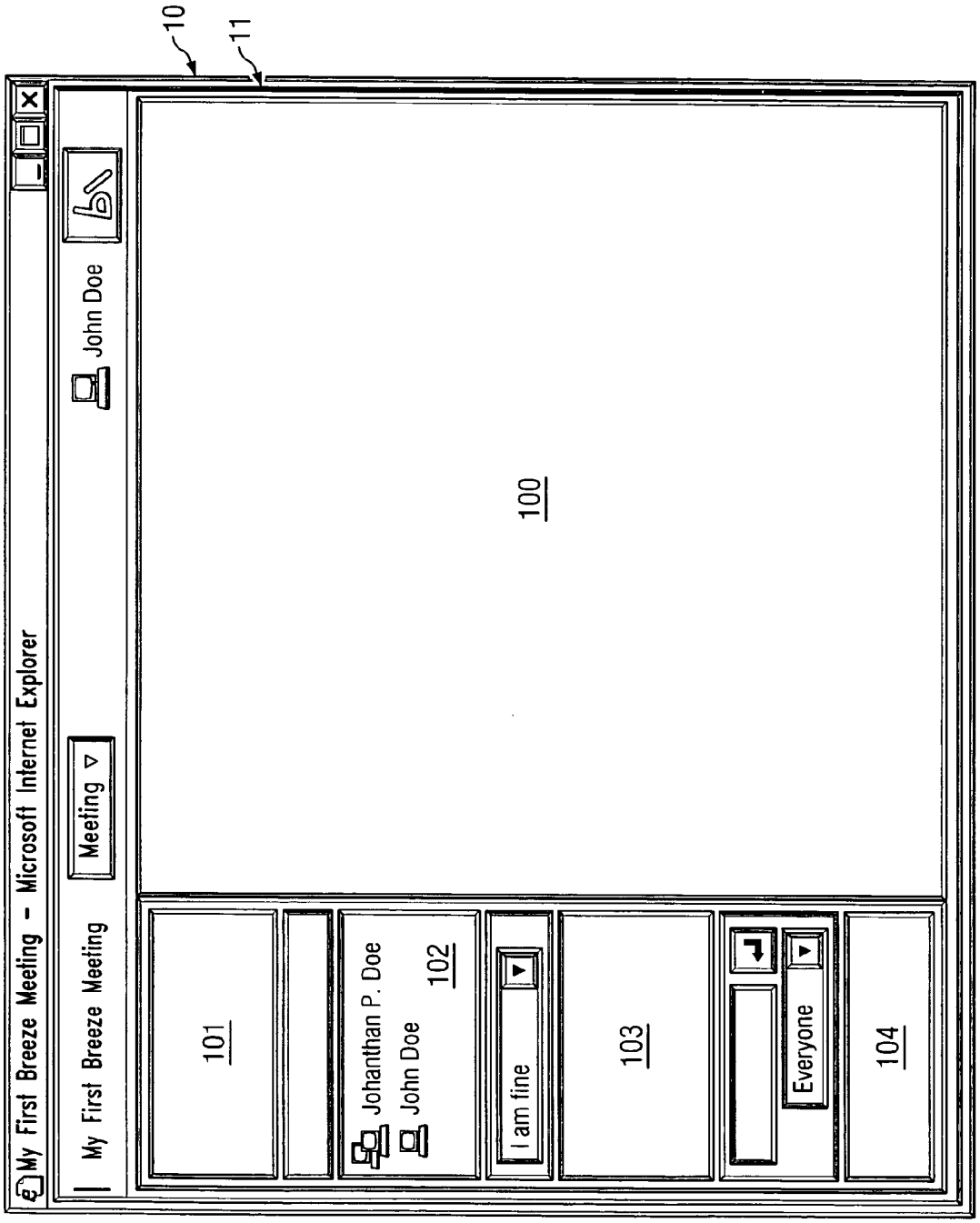
FIG. 1 is a screen shot illustrating a meeting canvas in an electronic meeting application configured according to an embodiment of the present invention.

FIG. 1 is a screen shot illustrating meeting canvas 10 in an electronic meeting application configured according to an embodiment of the present invention. Current scene 11 is shown displayed on meeting canvas 10 within the electronic meeting. Current scene 11 is made up of slides object 100, podium object 101, attendee object 102, chat object 103, and notes object 104. Each of the meeting viewers observes meeting canvas 10 and current scene 11, as shown in FIG. 1. For purposes of the example shown in FIG. 1, the electronic meeting has been created with multiple scenes and multiple presenters.

It should be noted that an electronic meeting is a generic term that may refer to any number of various collaborative electronic presentations. An electronic meeting or presentation may be a live meeting or presentation or a recorded meeting or presentation played for one or more participants.

Figure 2:
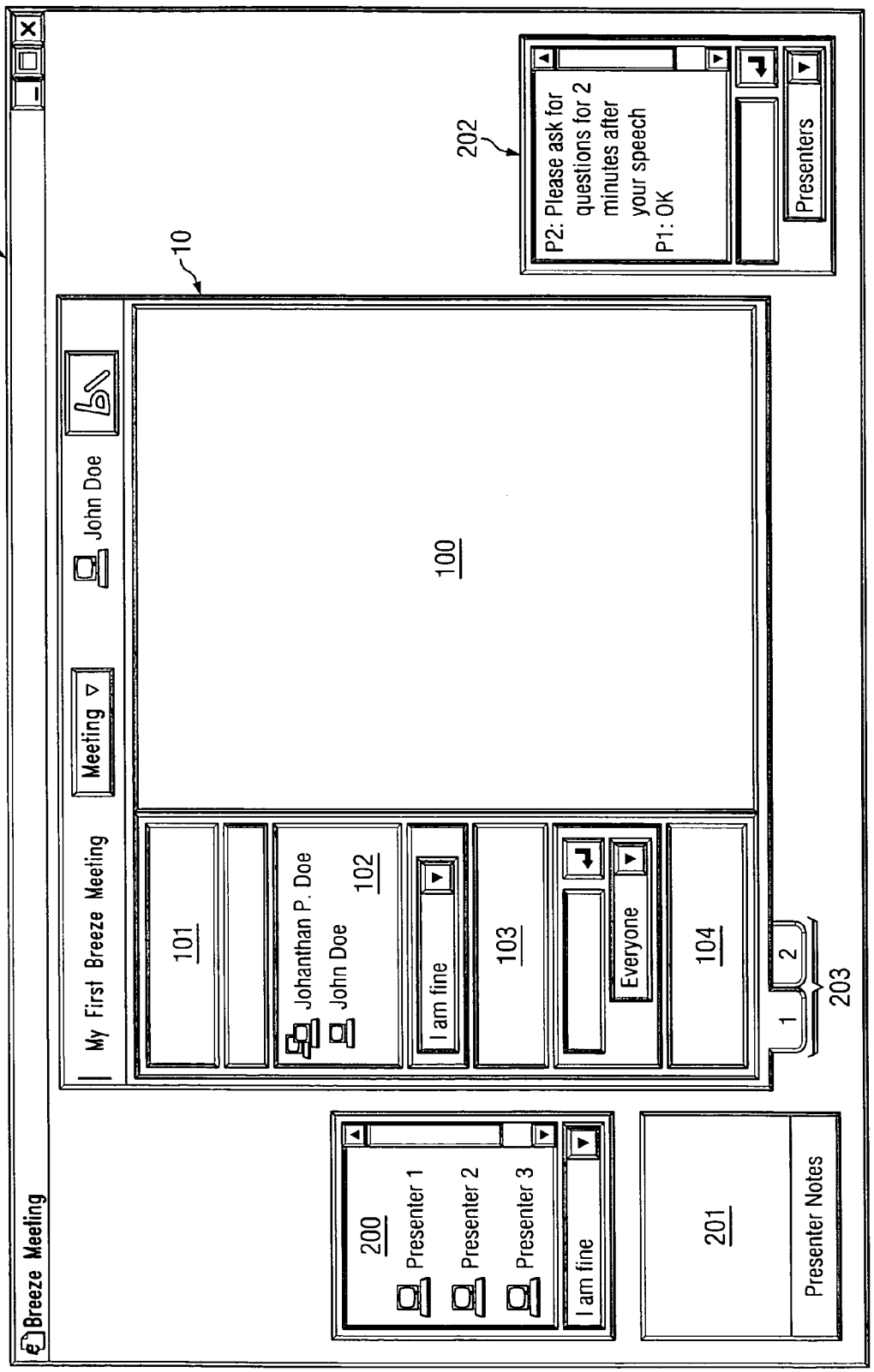
FIG. 2 is a screen shot illustrating an extended meeting canvas as it is arranged for meeting presenters.

FIG. 2 is a screen shot illustrating extending meeting canvas 20 as it is arranged for view by meeting presenters. Because meeting presenters may have a need or opportunity to use additional information during the course of an electronic meeting, an additional view area is presented to each meeting participant who has presenter rights in the embodiment illustrated in FIG. 2. Such a presenters-only canvas is disclosed in co-pending, commonly-owned U.S. patent application Ser. No. 10/856,734, entitled, "PRESENTER-ONLY MEETING CANVAS FOR COLLABORATIVE ELECTRONIC MEETING SPACE." In addition to current scene 11, as presented in FIG. 1, meeting canvas 10 displays presenter list object 200, presenter notes object 201, presenter chat object 202, and scene tabs 203 within the presenter-only canvas. Each of the presenter objects 200-203, are viewable only by the presenters of the current meeting. Furthermore, only presenters may interact with such presenter objects. Presenter chat object 202 allows presenters to communicate with each other without letting the meeting viewers see the communication. For example, presenter chat object 202 shows presenter 2 sending a note to presenter 1 to ask for questions after presenter 1 completes his or her presentation. For purposes of this hypothetical example, this message could be to allow presenter 2 time to review his or her scene or to even create or edit a scene for the electronic meeting.

Figure 3:
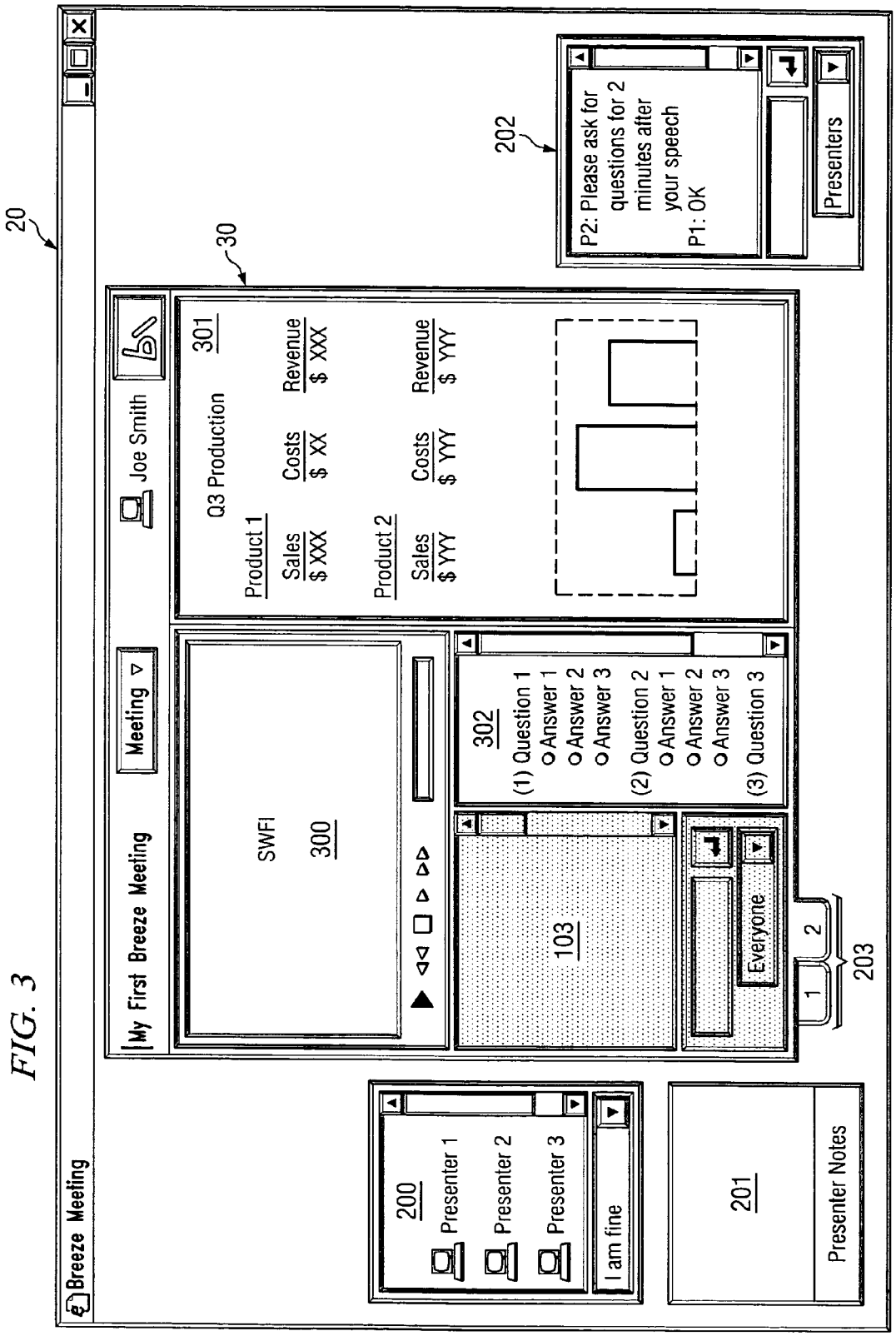
FIG. 3 is a screen shot illustrating a scene being reviewed by a meeting presenter entering a preparation status.

FIG. 3 is a screen shot illustrating scene 30 being reviewed by a meeting presenter entering a preparation status as defined in another embodiment of the present invention. While the electronic meeting is going on with current scene 11 (FIG. 1) being displayed to the meeting viewers, presenter 2 selects to edit or review scene 30. Scene 30 has been populated with animation object 300, spreadsheet object 301 (which may either be a shared screen or a slide or a rendered document image), quiz object 302, and chat object 103. Chat object 103 is illustrated with a shading that indicates that chat object 103 is being used on the active scene, current scene 11 (FIG. 1). Presenter 2 is limited in how he or she may modify chat object 103. A meeting object or pod that is shared between the active scene and an edited scene may be moved around the edited scene, re-sized, or both. Scene 30 shows that presenter 2 has re-sized chat object 103 to make it larger. While this change is illustrated on scene 30, it would not effect the size of the chat object 103, as shown in current scene 11 (FIG. 1).

Presenter 2 may also review the content of scene 30, such as by playing Small Web File 1 (SWF 1) in animation object 300, reviewing the content of spreadsheet object 301, looking over the questions of quiz object 302, and the like. Presenter 2 may review each of the meeting objects or pods on scene 30 while the ongoing meeting participants are viewing current scene 11 (FIG. 1). This may allow presenter 2 to practice a presentation or review before the presentation begins. The ability for a presenter in an electronic meeting to view a scene that is different from the active scene is driven by an interactive multimedia communication server (iMCS) hosting the electronic meeting.

An iMCS operating an electronic meeting application configured according to one embodiment of the present invention is capable of maintaining separate communication streams connected to the same electronic meeting for each meeting participant, including meeting presenters and meeting viewers. The iMCS transmits the communication streams for current scene 11 playing on meeting canvas 10 to each of the current meeting participants. However, the iMCS may also allow a separate communication stream to be sent to a presenter who wishes to prepare for the meeting by either reviewing or editing the inactive scenes. When a presenter selects to prepare a scene, a signal is sent from the presenter's instance of the electronic meeting application to the iMCS to suspend the data stream for current scene 11 (FIG. 1) and begin an editable connection for the selected scene, whether the selected scene is pre-existing or blank. Moreover, the iMCS may allow separate communication streams for other presenters wishing to prepare additional scenes in the same electronic meeting. One example of such an iMCS that includes the capabilities described above is MACROMEDIA INC.'s FLASH COMMUNICATION SERVER™ (FCS). When implemented in the FCS, the client-side of the electronic meeting may be presented to the participants using MACROMEDIA INC.'s MACROMEDIA FLASH™ player.

Figure 4:
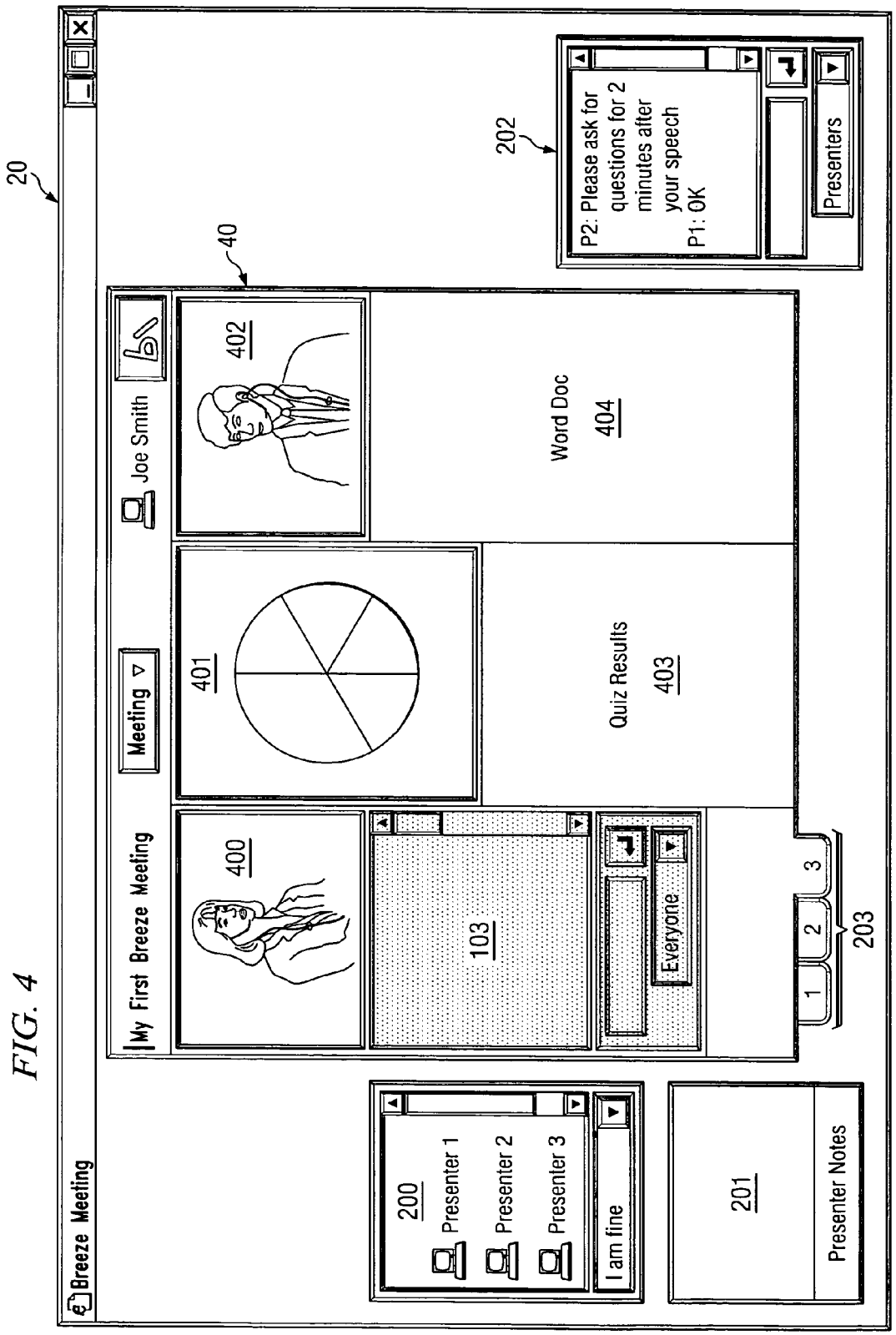
FIG. 4 is a screen shot illustrating a new scene created by a preparing meeting presenter during the meeting shown in FIG. 1.

FIG. 4 is a screen shot illustrating new scene 40 created by a preparing meeting presenter during the meeting shown in FIG. 1. In addition to reviewing and editing pending scenes in an electronic meeting, the various embodiments of the present invention allow a meeting presenter entering a preparation state to create completely new scenes, such as new scene 40. The meeting presenter selects to enter a preparation state and then may select to begin a new scene. As indicated in scenes tabs 203, a third tab has been added reflecting the addition of new scene 40. Extended meeting canvas 20 continues to display presenter meeting objects 200-203 for the ongoing electronic meeting to the preparing presenter. Additionally, a blank scene, new scene 40, is then displayed. The preparing presenter may then select the various meeting objects to place onto new scene 40, as well as the different input sources to feed those meeting objects.

New scene 40 is built by the preparing presenter using chat object 103, which is fed by the same input stream feeding chat object 103 on scene 11 (FIG. 1). Because chat object 103 is active on current scene 11 (FIG. 1), it is shown with a visible indicator which communicates to the preparing presenter that he or she cannot change the data within chat object 103. New scene 40 also includes video object 400, slides object 401, video object 402, quiz results object 403, and word processor document object 404. Slides object 401 may be fed with a presentation document, such as MICROSOFT CORPORATION's POWERPOINT™, MACROMEDIA FLASH™, or the like. The preparing presenter may upload the necessary slides document and word processing document, such as MICROSOFT CORPORATION's WORD™, COREL CORPORATION's WORDPERFECT™, and the like, to the hosting server. This input data is processed by the electronic meeting application on the host server to make it ready for presentation when new scene 40 becomes active.

Figure 5:
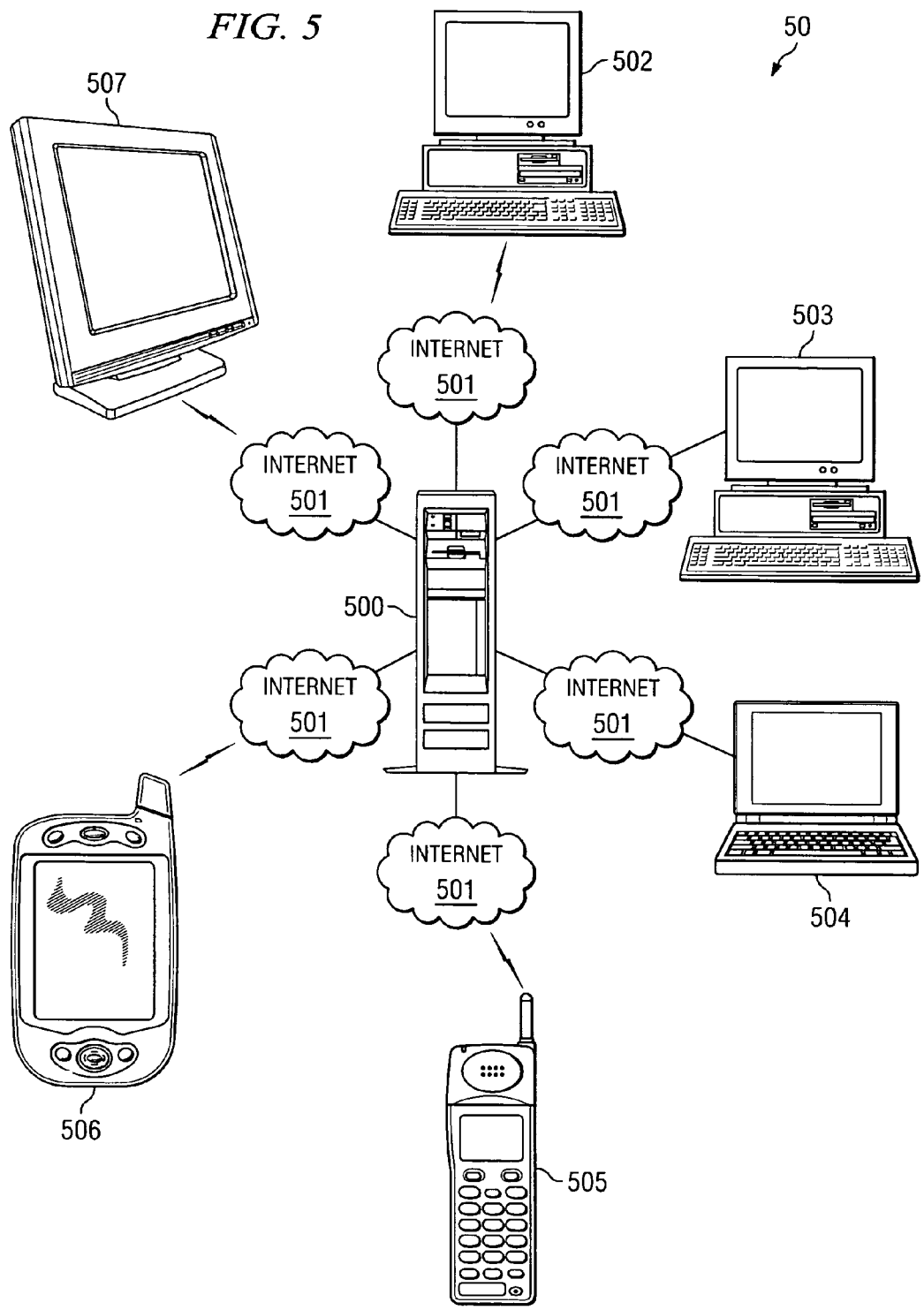
FIG. 5 is a block diagram illustrating an electronic presentation configured according to an additional embodiment of the present invention.

FIG. 5 is a block diagram illustrating electronic presentation 50 configured according to an additional embodiment of the present invention. Electronic presentation 50 is hosted by host server 500 running the server-side portion of an electronic meeting application. Multiple users, reflected by meeting participants 502-507, each run a client-side portion of the electronic meeting application that communicates with the server-side meeting application on host server 500. During electronic meeting 50, the data streams for the active scene are communicated between host server 500 and meeting participants 502-507 over Internet 501. Some of meeting participants 502-507 are meeting presenters and some are merely meeting observers. For purposes of this hypothetical example, meeting participants 503 and 507 are presenters. Thus, meeting participants 503 and 507 have additional rights with regard to electronic presentation 50.

Meeting participant 507 desires to edit some of the inactive scenes making up electronic presentation 50. Upon receiving an edit request, host server 500 suspends the data stream for the active scene going to meeting participant 507 and replaces that data stream with the stream supporting the desired inactive scene. Meeting participant 507 now views the selected inactive scene, while meeting participants 502-506 continue to view and interact with the active scene. Meeting participant 507 may edit the inactive presentation view by adding or changing meeting objects or by changing the underlying data source for those meeting objects. To change the underlying data, meeting participant 507 may upload new documents or data to host server 500 which will format and prepare the data for electronic meeting 50. Meeting participant 507 may also add new scenes to the multiple scenes making up electronic meeting 50. Again, in creating the new scene, the underlying data or documents for the new scene may be uploaded to and prepared by host server 500. Because meeting objects may be shared between different scenes, meeting participant 507 would be restricted in editing any meeting object that is shared with the active scene. Meeting participant 507 would be able to change the location or size of the shared meeting object in the inactive scene; however, this change would not be reflected in the instance of the shared meeting object on the active scene. Moreover, meeting participant 507 would not be able to change or effect the data underlying the shared meeting object as that would disrupt the ongoing meeting.

At anytime during the electronic meeting either of the presenters, meeting participant 503 and 507, may change the active scene to any of the other scenes in the meeting. If meeting participant 503 advances the active scene to one that is being edited by meeting participant 507, that scene becomes the active scene showing each of the edits made by meeting participant 507. Moreover, if active scene is assigned to either of the presenters, that presenter will take over controlling electronic meeting 50.

FIG. 6 is a flowchart illustrating example steps that may be executed in implementing one embodiment of the present invention. In step 600, presentation rights are assigned to users authorized to edit the electronic presentation, wherein the electronic presentation comprises a plurality of scenes each having at least one meeting object arranged on it. A request is received, in step 601, from one of the users with presentation rights to edit a selected one of the plurality of scenes. The selected one of the scenes is then displayed, in step 602, only to the requesting user, while the others continue viewing the active scene. In step 603, the selected scene may then be edited, which may include creating a new scene or editing existing inactive scenes, and may also include moving or resizing meeting objects that are shared with the active scene.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:

transmitting by a host server a first communication stream representing a current scene to at least one presenter and at least one user conducting a meeting, the current scene comprising at least one meeting object, the current scene being viewable by the at least one presenter and the at least one user;

transmitting by the host server a second communication stream representing an inactive scene to the at least one presenter, the inactive scene being viewable by the at least one presenter only;

receiving at least one object for the inactive scene from the at least one presenter during the meeting, the at least one object being associated with the meeting;

modifying the inactive scene by locating the at least one object in the inactive scene; and assigning presentation rights to the at least one presenter, wherein presentation rights authorize the at least one presenter to request a modification to at least one of the inactive scene or the current scene, wherein the modification comprises at least one of:

moving a position of the at least one object or the at least one meeting object within a respective scene; or resizing the at least one object or the at least one meeting object.

2. The method of claim 1, further comprising:

responsive to a command received from the at least one presenter, configuring the first communication stream by replacing the current scene with the inactive scene having the at least one object located therein, wherein the inactive screen having the at least one object located therein is viewable by the at least one presenter and the at least one user.

3. The method of claim 1, wherein the second communication stream representing the inactive scene to the at least one presenter is associated with a tab on a display to the at least one presenter provided by the host server, wherein, responsive to the at least one presenter selecting the tab, the inactive scene is viewable to the at least one presenter.

4. The method of claim 1, wherein the inactive scene is not viewable by the at least one user.

5. A computer program product having computer program logic stored on a computer-readable medium, the computer program product comprising:

code for transmitting a current scene to at least one presenter and at least one user conducting a meeting, the current scene comprising at least one meeting object, the current scene being viewable by the at least one presenter and the at least one user;

code for transmitting an inactive scene to the at least one presenter, the inactive scene being viewable by the at least one presenter only;

code for receiving at least one object for the inactive scene from the at least one presenter during the meeting, the at least one object being associated with the meeting;

code for modifying the inactive scene by locating the at least one object in the inactive scene; and code for assigning presentation rights to the at least one presenter, wherein presentation rights authorize the at least one presenter to request a modification to at least one of the inactive scene or the current scene, wherein the modification comprises at least one of:

moving a position of the at least one object or the at least one meeting object within a respective scene; or resizing the at least one object or the at least one meeting object.

6. The computer program product of claim 5, further comprising:

code for, responsive to a command received from the at least one presenter, replacing the current scene with the inactive scene having the at least one object located therein, wherein the inactive screen having the at least one object located therein is viewable by the at least one presenter and the at least one user.

7. The computer program product of claim 5, wherein the inactive scene is associated with a tab on a display to the at least one presenter provided by the host server, wherein, responsive to the at least one presenter selecting the tab, the inactive scene is viewable to the at least one presenter.

8. The computer program product of claim 5, wherein the inactive scene is not viewable by the at least one user.

9. The computer program product of claim 5, wherein code for providing the current scene to the at least one presenter and the at least one user conducting a meeting comprises code for transmitting a first communication stream representing the current scene to the at least one presenter and the at least one user, wherein code for providing the inactive scene to the at least one presenter comprises code for transmitting a second communication stream representing to the inactive scene to the at least one presenter only.

10. A computer system comprising:

a host server in communication with a first client computing device controllable by a user and in communication with a second client computing device controllable by a presenter, the user and the presenter being capable of conducting a meeting through the host server, the host server being capable of:

transmitting a first communication stream representing a current scene to the first client computing device controllable by the user and the second client computing device controllable by the presenter, wherein the current scene comprises at least one meeting object;

transmitting a second communication stream representing an inactive scene to the second client computing device controllable by the presenter, wherein the inactive scene is inaccessible to the first client computing device controllable by the user;

receiving at least one object for the inactive scene from the second client computing device controllable by the presenter, the at least one object being associated with the meeting;

modifying the inactive scene by locating the at least one object in the inactive scene; and assigning presentation rights to the presenter, wherein presentation rights authorize receipt of a modification to at least one of the inactive scene or the current scene from the second client computing device controllable by the presenter, wherein the modification comprises at least one of:

moving a position of the at least one object or the at least one meeting object within a respective scene; or resizing the at least one object or the at least one meeting object.

11. The computer system of claim 10, wherein the host server is capable of:

responsive to a command received from the second client computing device controllable by the presenter, configuring the first communication stream by replacing the current scene with the inactive scene having the at least one object located therein, wherein the inactive screen having the at least one object located therein is accessible to the first client computing device controllable by the user and the second client computing device controllable by the presenter.

12. The computer system of claim 10, wherein the second communication stream representing the inactive scene is associated with a tab displayed by the second client computing device to the presenter, wherein, responsive to the at least one presenter selecting the tab, the host server configures the inactive scene to be displayable by the second client computing device controllable by the presenter.

13. The computer system of claim 10, wherein the inactive scene is not displayable by the first client computing device controllable by the user.

* * * * *